United States Patent
Sakagami

(10) Patent No.: US 7,350,118 B2
(45) Date of Patent: Mar. 25, 2008

(54) METHOD AND APPARATUS FOR RECORDING INFORMATION IN CONCATENATED MANNER

(75) Inventor: Koubun Sakagami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 462 days.

(21) Appl. No.: 11/137,382

(22) Filed: May 26, 2005

(65) Prior Publication Data

US 2005/0268180 A1 Dec. 1, 2005

(30) Foreign Application Priority Data

May 27, 2004 (JP) ............... 2004-157354

(51) Int. Cl.
*G11B 7/006* (2006.01)
(52) U.S. Cl. .................. 714/701; 369/13.25; 714/775
(58) Field of Classification Search ............... 714/701, 714/775
See application file for complete search history.

(56) References Cited

U.S. PATENT DOCUMENTS

| 5,140,322 A | 8/1992 | Sakagami |
| 5,142,380 A | 8/1992 | Sakagami et al. |
| 5,497,194 A | 3/1996 | Sakagami et al. |
| 5,703,867 A * | 12/1997 | Miyauchi et al. ......... 369/59.11 |
| 6,031,800 A * | 2/2000 | Narumi et al. ............. 369/47.3 |
| 6,172,947 B1 * | 1/2001 | Senshu .................... 369/53.35 |
| 6,771,570 B1 * | 8/2004 | Wong et al. ............... 369/30.1 |
| 6,888,479 B2 | 5/2005 | Sakagami |
| 7,158,464 B2 * | 1/2007 | Gushima et al. ......... 369/59.25 |
| 7,190,663 B2 * | 3/2007 | Ando et al. ............... 369/275.3 |
| 2003/0112667 A1 | 6/2003 | Shimizu et al. |
| 2003/0169666 A1 | 9/2003 | Sakagami |
| 2004/0009371 A1 | 1/2004 | Sakagami et al. |
| 2004/0085878 A1 | 5/2004 | Sakagami et al. |
| 2004/0100883 A1 | 5/2004 | Sakagami |

FOREIGN PATENT DOCUMENTS

| JP | 2002-83466 | 3/2002 |
| JP | 2002-260339 | 9/2002 |
| JP | 2002-260341 | 9/2002 |
| JP | 3367657 | 11/2002 |
| JP | 2003-59206 | 2/2003 |

OTHER PUBLICATIONS

U.S. Appl. No. 07/639,094.*
Shimizu et al., "Multi-Level Recording on Phase-Change Optical Discs" Ricoh Technical Report No. 28, pp. 34-41, Dec. 2002.

* cited by examiner

Primary Examiner—Stephen M. Baker
(74) Attorney, Agent, or Firm—Dickstein Shapiro LLP

(57) ABSTRACT

A method of recording data as presence/absence of marks on an information recording medium includes a step of obtaining data pieces, each of which has size of one block and is made by adding error-correction-purpose data to information data, a step of attaching to each of the data pieces a synchronizing signal that includes a portion having the marks and a portion having no mark, a step of recording the data pieces on the information recording medium in units of the one block inclusive of the synchronizing signal, and a step of placing a concatenation point at a predetermined position within the synchronizing signal when adding, or writing in an overwriting manner, the data pieces in units of the one block, the concatenation point defining a position at which said adding or said writing starts.

26 Claims, 11 Drawing Sheets

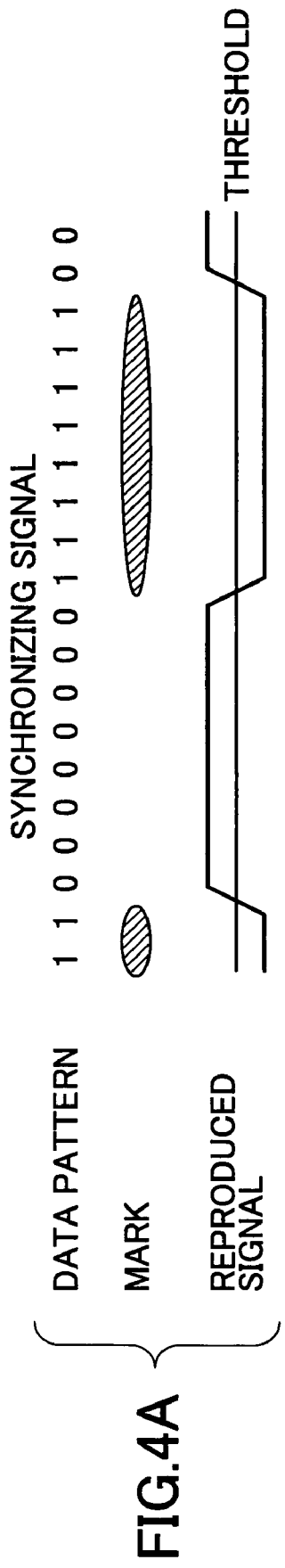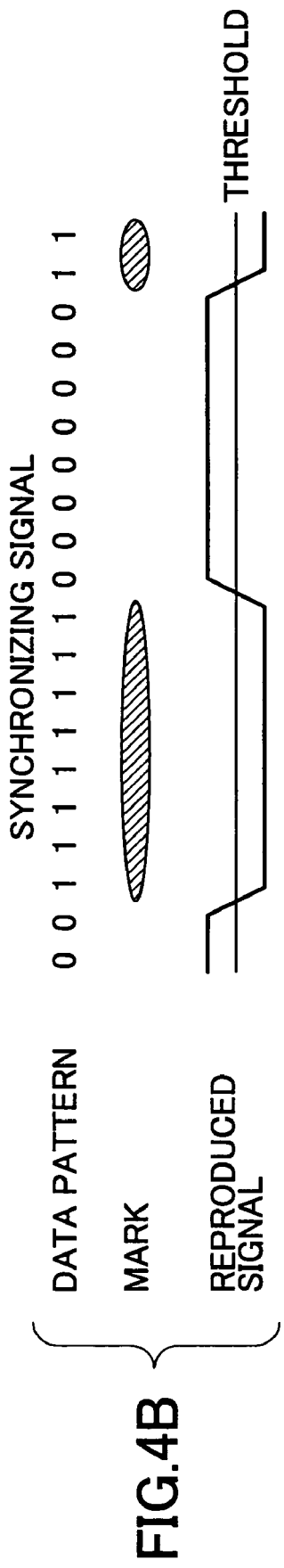

| MULTILEVEL DATA | MARK SHAPE |
|---|---|
| 0 | (NO MARK RECORDING) |
| 1 | |
| 2 | |
| 3 | |
| 4 | |
| 5 | |
| 6 | |
| 7 | |

REPRODUCED SIGNAL

METHOD AND APPARATUS FOR RECORDING INFORMATION IN CONCATENATED MANNER

BACKGROUND OF THE INVENTION

1. Field of the Invention

The present invention generally relates to apparatuses and methods for recording information and apparatuses and methods for reproducing information. The present invention particularly relates to an information recording apparatus and method which add or write (in an overwriting manner) binary or multilevel data to an information recording medium such as an optical disk, and also relates to an information reproducing apparatus and method which reproduce the recorded information.

2. Description of the Related Art

When information needs to be recorded on a certain type of information recording medium, the information may be recorded in a concatenated manner such as to follow the existing information recorded on the previous occasion. Technology for recording information in such a concatenated manner includes the following examples.

The "concatenated data recording/reproducing method and apparatus" of Patent Document 1 discloses a method of adding, or writing in an overwriting manner, data to an optical disk. In the case of DVD-RW, data up to the 16-th byte of the first frame of the first sector is recorded with respect to an ECC block that serves as a unit of recording. When concatenated recording is required, provision is made to start concatenated recording at the 15 to 17-th byte of the first frame of the first sector.

The "information recording medium recording method" of Patent Document 2 discloses a method of adding, or writing in an overwriting manner, data to an optical disk. When concatenated recording is required, provision is made to start concatenated recording at the 1 to 3-rd byte of the third frame of the first sector. In the case of concatenated recording for DVD-R, provision is made to start concatenated recording at the 82 to 87-th byte of the second frame of the first sector.

The "recordable information recording medium, read-only information recording medium, and method of preventing illegal copying" of Patent Document 3 discloses preventing illegal copying by recording data in units of one ECC block, by arranging linking areas comprised of two sync frames at the boundaries between ECC blocks, and by forming a line of emboss pits as asperities in advance in the linking areas.

The "information recording apparatus, information recording method, information recording medium, and information reproducing apparatus" of Patent Document 4 discloses recording data in units of one ECC block and providing a linking area comprised of two sync frames at the boundaries between ECC blocks.

The "information recording medium" of Patent Document 5 discloses recording data in units of one ECC block and providing a linking area comprised of one sync frame at the boundaries between ECC blocks. In this linking area, a special pattern called "VFO" is recorded in order to stabilize the operation of the data reproduction system (PLL circuit).

With regard to multilevel recording, Non-Patent Document 1, for example, discloses signal processing performed at the time of recording/reproducing multilevel data as a technology for improving recording density. In order to increase the storage capacity of an optical disk, the multilevel recording of 0 to 7 (8 levels) is performed in contrast with the conventional binary recording of 0 and 1. When multilevel data is to be recorded, 11 bits of binary data are modulated into four 8-level data items for recording as shown on P. 39 and FIG. 12, for example.

[Patent Document 1] Japanese Patent Application Publication No. 2002-83466

[Patent Document 2] Japanese Patent No. 3367657

[Patent Document 3] Japanese Patent Application Publication No. 2002-260339

[Patent Document 4] Japanese Patent Application Publication No. 2002-260341

[Patent Document 5] Japanese Patent Application Publication No. 2003-59206

[Non-Patent Document 1] Ricoh Technical Report No. 28 P. 34-P. 41

In the case of Patent Document 1 and 2, a predetermined location within an ECC block is used as a concatenation point at which concatenated recording is performed. At the time of data reproduction, therefore, data for approximately two frames (one horizontal line in the ECC block) following the concatenation point is not properly reproduced, resulting in error data. In the ECC block that includes the concatenation point, data preceding the concatenation point is recorded on the previous occasion, and has nothing to do with the data following the concatenation point. When error correction is performed in this ECC block, thus, the data preceding the concatenation point ends up being treated as error data. Accordingly, in an ECC block that includes a concatenation point, a large amount of error data is generated over the area extending from the start of the block to the end of the two frames following the concatenation point.

In the case of Patent Documents 3, 4, and 5, dedicated linking areas are provided as additions at the boundaries between ECC blocks. This gives rise to a problem in that recording capacity is reduced.

Non-Patent Document 1 discloses a modulation method for recording multilevel data and a demodulation method for reproducing the multilevel data for the purpose of improving recording density. There is no teaching of a data structure usable for error correction. There is thus a problem in that a practical optical-disk system cannot be brought to fruition.

Accordingly, there is a need for scheme that can suppress data errors in an ECC block at the time of data reproduction without reducing recording capacity when information is added or written by concatenated recording to an information recording medium such as an optical disk.

Further, there is a need for the same scheme in the case of multilevel recording.

SUMMARY OF THE INVENTION

It is a general object of the present invention to provide an information recording/reproducing scheme that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by information recording/reproducing scheme particularly pointed out in the specification in such full, clear, concise, and exact terms as to enable a person having ordinary skill in the art to practice the invention.

To achieve these and other advantages in accordance with the purpose of the invention, the invention provides a method of recording data as presence/absence of marks on an information recording medium, which includes a step of obtaining data pieces, each of which has size of one block and is made by adding error-correction-purpose data to information data, a step of attaching to each of the data pieces a synchronizing signal that includes a portion having the marks and a portion having no mark, a step of recording the data pieces on the information recording medium in units of the one block inclusive of the synchronizing signal, and a step of placing a concatenation point at a predetermined position within the synchronizing signal when adding, or writing in an overwriting manner, the data pieces in units of the one block, the concatenation point defining a position at which the adding or the writing starts.

According to another aspect of the present invention, the step of placing places the concatenation point at the portion having no mark in the synchronizing signal.

According to another aspect of the present invention, the method as described above further includes a step of adding information to a block immediately preceding the concatenation point, the information indicating that the block immediately preceding the concatenation point is a last recorded block.

According to another aspect of the present invention, the step of attaching attaches such synchronizing signal that the concatenation point is placed on the portion having no mark.

According to another aspect of the present invention, a method of recording multilevel data by changing size of marks on an information recording medium includes a step of obtaining data pieces, each of which has size of one block and is made by adding error-correction-purpose data to binary information data, converting the data pieces into multilevel data pieces, a step of attaching to each of the multilevel data pieces a synchronizing signal that includes a portion having the marks and a portion having no mark, a step of recording the multilevel data pieces on the information recording medium in units of the one block inclusive of the synchronizing signal, and a step of placing a concatenation point at a predetermined position within the synchronizing signal when adding, or writing in an overwriting manner, the multilevel data pieces in units of the one block, the concatenation point defining a position at which the adding or the writing starts.

According to another aspect of the present invention, the step of placing places the concatenation point at the portion having no mark in the synchronizing signal.

According to another aspect of the present invention, the method as described above further includes a step of adding information to a block immediately preceding the concatenation point, the information indicating that the block immediately preceding the concatenation point is a last recorded block.

According to another aspect of the present invention, the method as described above further includes a step of attaching to a portion following the synchronizing signal a signal for detecting a time interval of the multilevel data.

According to another aspect of the present invention, a method of reproducing the data pieces from the information recording medium recorded by the recording method as described above includes a step of detecting binary data as presence/absence of the marks in a signal reproduced from the information recording medium, a step of detecting the synchronizing signal in the detected binary data according to predetermined detection conditions, a step of producing the information data by performing error correction on the detected binary data by use of the error-correction-purpose data, a step of detecting the information indicating the last recorded block in the detected binary data, and a step of modifying the detection conditions when detecting the synchronizing signal at the concatenation point in response to the detection of the information indicating the last recorded block.

According to another aspect of the present invention, the step of modifying the detection conditions disregards the detection conditions regarding a length of a signal portion containing the concatenation point.

According to another aspect of the present invention, a method of reproducing the multilevel data pieces from the information recording medium recorded by the recording method as described above includes a step of detecting multilevel data by detecting the marks in a signal reproduced from the information recording medium, a step of detecting the synchronizing signal in the detected multilevel data according to predetermined detection conditions, a step of converting the detected multilevel data into binary data, a step of producing the information data by performing error correction on the binary data by use of the error-correction-purpose data, a step of detecting the information indicating the last recorded block in the binary data, and a step of modifying the detection conditions when detecting the synchronizing signal at the concatenation point in response to the detection of the information indicating the last recorded block.

According to another aspect of the present invention, a method of reproducing the multilevel data pieces from the information recording medium recorded by the recording method as described above includes a step of detecting multilevel data by detecting the marks in a signal reproduced from the information recording medium, a step of detecting the synchronizing signal in the detected multilevel data according to predetermined detection conditions, a step of converting the detected multilevel data into binary data, a step of producing the information data by performing error correction on the binary data by use of the error-correction-purpose data, a step of detecting the information indicating the last recorded block in the binary data, a step of modifying the detection conditions when detecting the synchronizing signal at the concatenation point in response to the detection of the information indicating the last recorded block, and a step of re-synchronizing a clock signal synchronized with the detected multilevel data in response to the signal for detecting a time interval of the multilevel data.

According to another aspect of the present invention, the step of modifying the detection conditions disregards the detection conditions regarding a length of a signal portion containing the concatenation point.

According to another aspect of the present invention, an apparatus for recording data as presence/absence of marks on an information recording medium includes an obtaining unit configured to obtain data pieces, each of which has size of one block and is made by adding error-correction-purpose data to information data, an attaching unit configured to attach to each of the data pieces a synchronizing signal that includes a portion having the marks and a portion having no mark, a recording unit configured to record the data pieces on the information recording medium in units of the one block inclusive of the synchronizing signal, and a placing unit configured to place a concatenation point at a predetermined position within the synchronizing signal when adding, or writing in an overwriting manner, the data pieces in units of the one block, the concatenation point defining a position at which the adding or the writing starts.

According to another aspect of the present invention, the placing unit is configured to place the concatenation point at the portion having no mark in the synchronizing signal.

According to another aspect of the present invention, the apparatus as described above further includes a unit configured to add information to a block immediately preceding the concatenation point, the information indicating that the block immediately preceding the concatenation point is a last recorded block.

According to another aspect of the present invention, the attaching unit is configured to attach such synchronizing signal that the concatenation point is placed on the portion having no mark.

According to another aspect of the present invention, an apparatus for recording multilevel data by changing size of marks on an information recording medium includes an obtaining unit configured to obtain data pieces, each of which has size of one block and is made by adding error-correction-purpose data to binary information data, a converting unit configured to convert the data pieces into multilevel data pieces, an attaching unit configured to attach to each of the multilevel data pieces a synchronizing signal that includes a portion having the marks and a portion having no mark, a recording unit configured to record the multilevel data pieces on the information recording medium in units of the one block inclusive of the synchronizing signal, and a placing unit configured to place a concatenation point at a predetermined position within the synchronizing signal when adding, or writing in an overwriting manner, the multilevel data pieces in units of the one block, the concatenation point defining a position at which the adding or the writing starts.

According to another aspect of the present invention, the placing unit is configured to place the concatenation point at the portion having no mark in the synchronizing signal.

According to another aspect of the present invention, the apparatus as described above further includes an adding unit configured to add information to a block immediately preceding the concatenation point, the information indicating that the block immediately preceding the concatenation point is a last recorded block.

According to another aspect of the present invention, the apparatus as described above further includes a unit configured to attach to a portion following the synchronizing signal a signal for detecting a time interval of the multilevel data.

According to another aspect of the present invention, an apparatus for reproducing the data pieces from the information recording medium recorded by the recording method as described above includes a data detecting unit configured to detect binary data as presence/absence of the marks in a signal reproduced from the information recording medium, a synchronizing signal detecting unit configured to detect the synchronizing signal in the detected binary data according to predetermined detection conditions, a producing unit configured to produce the information data by performing error correction on the detected binary data by use of the error-correction-purpose data, an information detecting unit configured to detect the information indicating the last recorded block in the detected binary data, and a modifying unit configured to modify the detection conditions when detecting the synchronizing signal at the concatenation point in response to the detection of the information indicating the last recorded block.

According to another aspect of the present invention, the modifying step is configured to disregard the detection conditions regarding a length of a signal portion containing the concatenation point.

According to another aspect of the present invention, an apparatus for reproducing the multilevel data pieces from the information recording medium recorded by the recording method as described above includes a data detecting unit configured to detect multilevel data by detecting the marks in a signal reproduced from the information recording medium, a synchronizing signal detecting unit configured to detect the synchronizing signal in the detected multilevel data according to predetermined detection conditions, a converting unit configured to convert the detected multilevel data into binary data, a producing unit configured to produce the information data by performing error correction on the binary data by use of the error-correction-purpose data, an information detecting unit configured to detect the information indicating the last recorded block in the binary data, and a modifying unit configured to modify the detection conditions when detecting the synchronizing signal at the concatenation point in response to the detection of the information indicating the last recorded block.

According to another aspect of the present invention, an apparatus for reproducing the multilevel data pieces from the information recording medium recorded by the recording method as described above includes a data detecting unit configured to detect multilevel data by detecting the marks in a signal reproduced from the information recording medium, a synchronizing signal detecting unit configured to detect the synchronizing signal in the detected multilevel data according to predetermined detection conditions, a converting unit configured to convert the detected multilevel data into binary data, a producing unit configured to produce the information data by performing error correction on the binary data by use of the error-correction-purpose data, an information detecting unit configured to detect the information indicating the last recorded block in the binary data, a modifying unit configured to modify the detection conditions when detecting the synchronizing signal at the concatenation point in response to the detection of the information indicating the last recorded block, and a re-synchronizing unit configured to re-synchronize a clock signal synchronized with the detected multilevel data in response to the signal for detecting a time interval of the multilevel data.

According to another aspect of the present invention, the modifying unit is configured to disregard the detection conditions regarding a length of a signal portion containing the concatenation point.

According to at least one embodiment of the present invention, binary recording is performed by recording data by presence/absence of marks on the information recording medium. In so doing, the data of one block that is the unit of recording is provided with a synchronizing signal attached thereto including a portion having marks and a portion having no mark, and a predetermined position within the synchronizing signal is used as a concatenation point for adding data or writing data in an overwriting manner. This can suppress the generation of data errors in the ECC block at the time of data reproduction without suffering the lowering of record capacity due to the recording of the concatenation point.

According to at least one embodiment of the present invention, the portion where no recording is made in the synchronizing signal, i.e., the portion having no mark, is used as a position where the concatenation point is placed.

This provision is suitable to the information recording medium of the write-once type.

According to at least one embodiment of the present invention, the block immediately preceding the concatenation point is provided with information attached thereto indicative of a last recorded block. This allows a special process for reproducing the concatenation point to be performed at the time of data reproduction, thereby further reducing the generation of data errors in the ECC block.

According to at least one embodiment of the present invention, such a synchronizing signal is added that the concatenation point is placed at the portion having no mark. This can suppress the generation of data errors in the ECC block.

According to at least one embodiment of the present invention, multilevel recording is performed by changing the size of marks formed on the information recording medium. In so doing, the data of one block that is the unit of recording is provided with a synchronizing signal attached thereto including a portion having marks and a portion having no mark, and a predetermined position within the synchronizing signal is used as a concatenation point for adding data or writing data in an overwriting manner. This can suppress the generation of data errors in the ECC block at the time of data reproduction without suffering the lowering of record capacity due to the recording of the concatenation point.

According to at least one embodiment of the multilevel recording of the present invention, the portion where no recording is made in the synchronizing signal, i.e., the portion having no mark, is used as a position where the concatenation point is placed. This provision is suitable to the information recording medium of the write-once type.

According to at least one embodiment of the multilevel recording of the present invention, the block immediately preceding the concatenation point is provided with information attached thereto indicative of a last recorded block. This allows a special process for reproducing the concatenation point to be performed at the time of data reproduction, thereby further reducing the generation of data errors in the ECC block.

According to at least one embodiment of the multilevel recording of the present invention, a signal for detecting a time interval of multilevel data is added to a portion following the synchronizing signal. This can further suppress the generation of data errors in the ECC block at the time of data reproduction.

According to at least one embodiment of the present invention, the information indicative of the last recorded block is detected at the time of reproducing data from a binary-data-recorded information recording medium, and the detection conditions used to detect the synchronizing signal are modified at the time of detecting a synchronizing signal positioned at a concatenation point. For example, the length of the signal portion containing the concatenation point may be disregarded. This can avoid an error in the detection of the synchronizing signal, thereby suppressing the generation of data errors in the ECC block.

According to at least one embodiment of the present invention, the information indicative of the last recorded block is detected at the time of reproducing data from a multilevel-data-recorded information recording medium, and the detection conditions used to detect the synchronizing signal are modified at the time of detecting a synchronizing signal positioned at a concatenation point. For example, the length of the signal portion containing the concatenation point may be disregarded. This can avoid an error in the detection of the synchronizing signal, thereby suppressing the generation of data errors in the ECC block.

According to at least one embodiment of the present invention, the information indicative of the last recorded block is detected at the time of reproducing data from a multilevel-data-recorded information recording medium, and the synchronizing signal positioned at a concatenation point is detected, followed by re-synchronizing a clock signal synchronized with the multilevel data by use of the signal for detecting a time interval of the multilevel data. This can stabilize the operation of a PLL circuit, thereby suppressing the generation of data errors in the ECC block.

BRIEF DESCRIPTION OF THE DRAWINGS

Other objects and further features of the present invention will be apparent from the following detailed description when read in conjunction with the accompanying drawings, in which:

FIGS. 4A and 4B are drawings showing a case in which two types of synchronizing signals are used;

DESCRIPTION OF THE PREFERRED EMBODIMENTS

In the following, embodiments of the present invention will be described with reference to the accompanying drawings.

First Embodiment

The first embodiment of the present invention will be described with reference to FIGS. 1A and 1B through FIG. 6. This embodiment shows an example in which the present invention is applied to binary recording.

A. Principle of Invention as Applied to Binary Recording

Figure 1A:
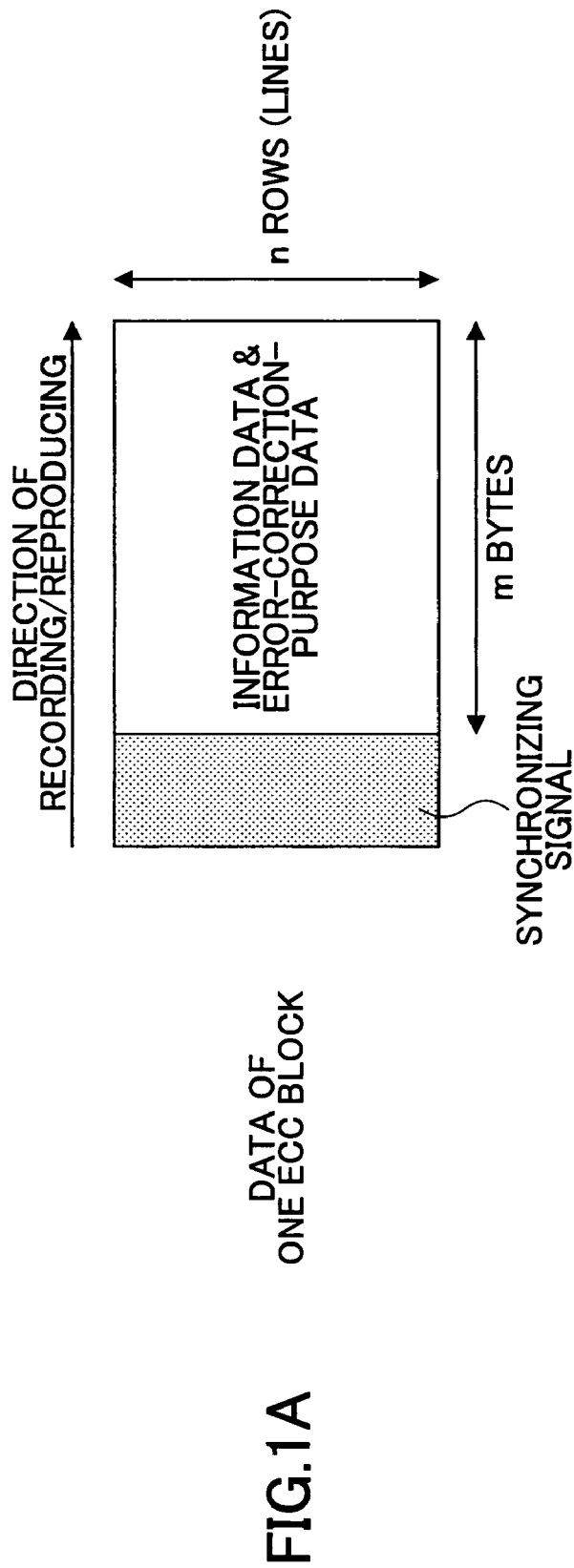
FIG. 1A is a drawing showing an example of a data structure used when information data is recorded on an information recording medium such as an optical disk.

FIG. 1A is a drawing showing an example of a data structure used when information data is recorded on an information recording medium such as an optical disk. First, correction-purpose data is added to the information data to be recorded. For example, the data structure used in DVD (Digital Versatile Disc) may suitably be used. As described in paragraphs 0023 to 0032 of Japanese Patent Application Publication No. 2002-313027, the DVD data structure has error-correction-purpose data in the horizontal and vertical directions added to 16-sector data. Here, a data series in the horizontal direction is referred to as "row". A data block is then comprised of 208 (n: natural number) rows with 182 (m: natural number) bytes per row. This block is called an ECC (Error Correcting Code) block.

Figure 1B:
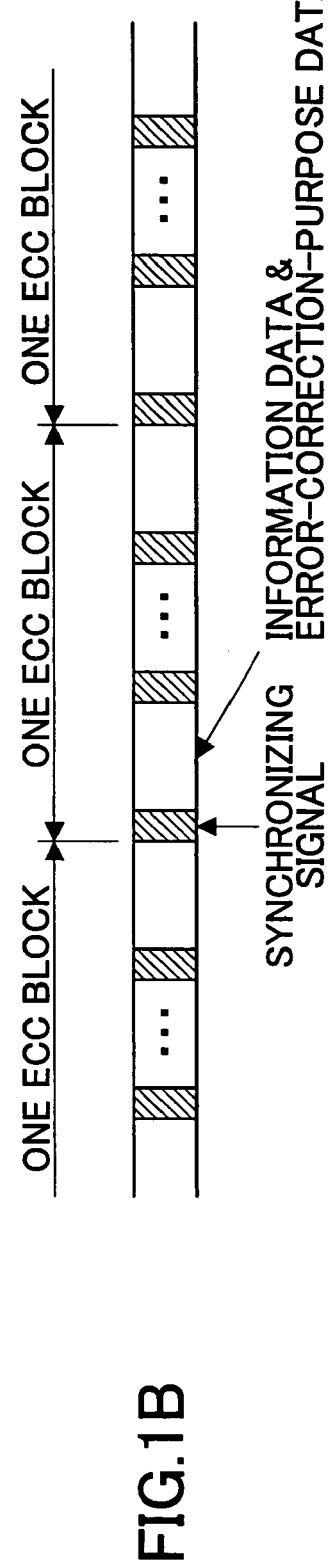
FIG. 1B is an illustrative drawing showing the way in which data for individual rows are arranged continuously at the time of recording/reproducing.

Sector data for one sector includes user data such as image, audio, or computer data as main information data. The sector data also includes disk identification data for identifying a disk as to whether the disk is a read-only type or a rewritable type, whether the data recording layer is a single layer structure or a multilayer structure, etc. The sector data further includes sector-specific address information for accessing data and backup data for the purpose of controlling copyright. Such ECC block data, with a synchronizing signal added thereto, is recorded row by row from left to right as shown in FIG. 1A on an information recording medium such as an optical disk. FIG. 1B is an illustrative drawing showing the way in which data for individual rows are arranged continuously at the time of recording/reproducing.

Figure 2:
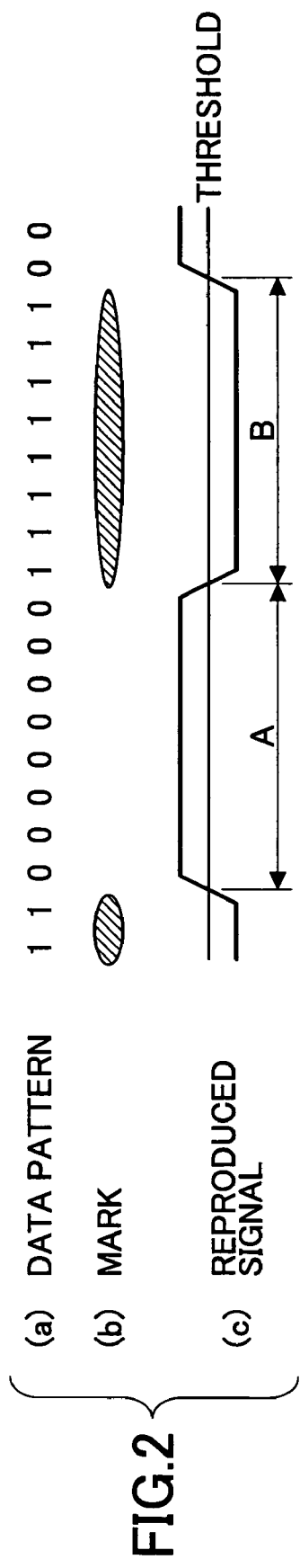
FIG. 2 is a drawing showing an example of a data pattern of a synchronizing signal.

FIG. 2 is a drawing showing an example of a data pattern of the synchronizing signal. In general, information data and error-correction-purpose data manifest themselves as data patterns having randomly arranged 0s and 1s. For the purpose of easy distinction from such pattern, the synchronizing signal uses a data pattern in which 0s and 1s are each arranged continuously.

0 and 1 are recorded on an optical disk as the presence and absence of marks, respectively. For example, a laser beam may be shone on a phase-change-type optical disk to change the recording material on the optical disk into a crystalline state or amorphous state, thereby producing changes in the reflective index. In this case, the amorphous state portion has a lower reflective index, which is hereinafter referred to as "mark".

When weak laser light having a constant power is shone on the optical disk, the amount of reflected light changes in response to the presence/absence of marks. Such changes are subjected to optoelectrical conversion, resulting in a reproduced signal being obtained as an electrical signal. At the bottom of FIG. 2, a reproduced signal waveform corresponding to the synchronizing signal is shown. This synchronizing signal is binarized by use of a predetermined threshold. A check is then made as to whether the interval of signal inversions (A and B in FIG. 2) satisfies predetermined conditions, thereby detecting a synchronizing signal.

Figure 3:
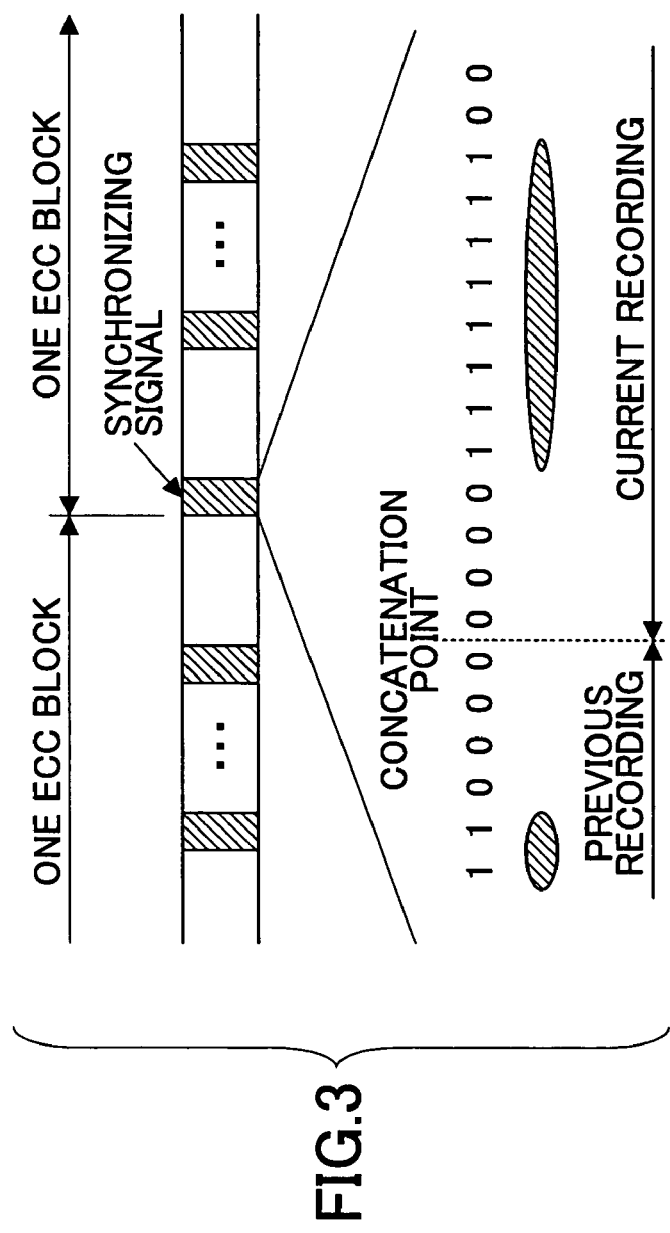
FIG. 3 is a drawing showing the positioning of a concatenation point.

Data is recorded on an optical disk in units of one ECC block. Accordingly, the adding or writing in an overwriting manner of data is also performed in units of one ECC block. In this embodiment, a concatenation point is located at a predetermined position in the synchronizing signal, i.e., at the portion where no mark is provided (the portion where 0s are continuously arranged). FIG. 3 is a drawing showing such positioning of a concatenation point. In the related art disclosed in Patent Documents 1 and 2, the concatenation point is situated among the data contained in an ECC block. The data provided between the start of the ECC block and the concatenation point is the data recorded on the previous occasion, and has no bearing on the data that is recorded on a subsequent occasion. Because of this, the data provided between the start of the ECC block and the concatenation point ends up being treated as error data. In the present embodiment, on the other hand, a predetermined position in the synchronizing signal is used as a concatenation point, so that there is no irrelevant data inserted into the ECC block. This successfully suppresses the generation of data error in the ECC block at the time of data reproduction. Further, an area (i.e., the related-art linking area) inclusive of a concatenation point is not provided in addition to ECC blocks, thereby avoiding reduction in recording capacity.

In the present embodiment, the concatenation point is positioned in the synchronizing signal at the portion where no marks are provided. If a rewritable-type medium on which erasure of data is possible is used as an information recording medium, such concatenation point may alternatively be positioned at the portion where marks are present.

If a write-once-type medium on which erasure of data is not possible is used as an information recording medium, the concatenation point may preferably be positioned at the portion where no marks are present. This is because if the mark portion recorded on the present occasion overlaps the mark portion of the synchronizing signal recorded on the previous occasion at the time of adding data, the correct recording of marks is not achievable. With the provision of the concatenation point at the portion where no marks are provided (no recording is made), it is possible to avoid the failure to record marks at the concatenation point.

In the optical disk for binary recording as used in the present embodiment, the polarization of a reproduced signal (high and low of the binarized signal) may not be given any significance, and intervals between the points of changes (i.e., the interval of signal inversions) may be given significance at the time of recording. In such a case, two types of synchronizing signals may be used. FIGS. 4A and 4B are drawings showing a case in which two types of synchronizing signals are used. When a write-once-type information recording medium is used with the provision of the concatenation point at the portion where no marks are in existence, the use of the synchronizing signal as shown in FIG. 4B may run the risk of suffering the failure to record marks. As a synchronizing signal for use at the boundaries between ECC blocks, therefore, the synchronizing signal as shown in FIG. 4A is preferable. With this provision, the failure to record marks at the concatenation point is avoided, and erroneous detection of a synchronizing signal is prevented. This can further suppress the generation of data error in an ECC block at the time of data reproduction.

Figure 5A:
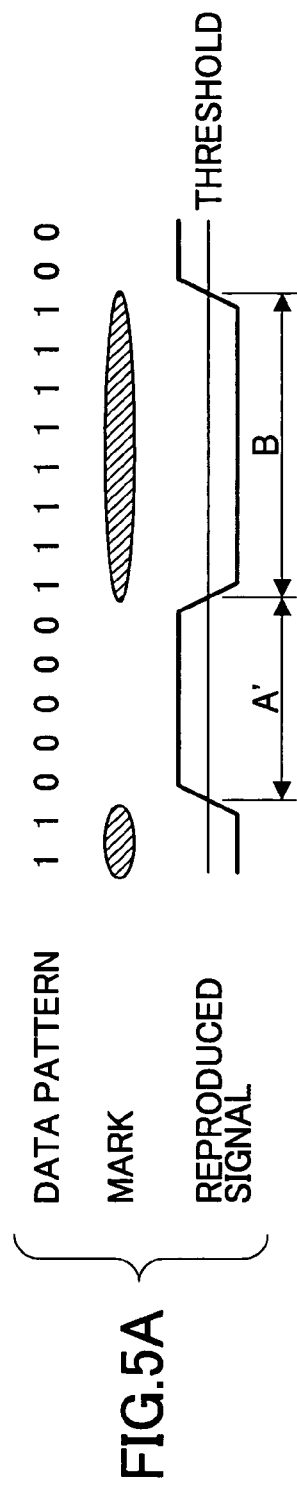
FIGS. 5A and 5B are drawings showing cases in which the length of a portion without marks of a synchronizing signal is changed around a concatenation point.
Figure 5B:
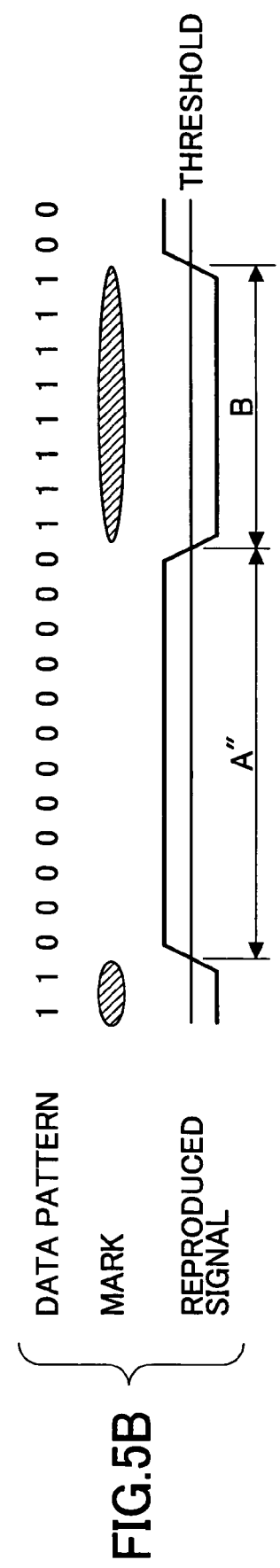

When data is added, or written in an overwriting manner, to an optical disk, it is not guaranteed that the start position of data recording always coincide exactly with the concatenation position. There may be some error. As a result, the length of the portion without marks of the synchronizing signal may be changed around the concatenation point. FIGS. 5A and 5B are drawings showing cases in which the length of the portion without marks of the synchronizing signal is changed around the concatenation point. Namely, the interval A of signal inversions shown in FIG. 2 is generally almost fixed in a reproduced synchronizing signal. As shown in FIGS. 5A and 5B, however, the interval of signal inversions may be shortened to A' or lengthened to A". In such a case, if an attempt is made to detect a synchronizing signal based on the conditions of the signal inversion intervals A and B in the same manner as in the detection of a normal synchronizing signal, the conditions of the interval A is not satisfied, resulting in a failure to detect the synchronizing signal at the concatenation point.

In consideration of this, the conditions of the signal inversion interval A (the conditions of the length of the signal portion inclusive of the concatenation point) may be disregarded when detecting a synchronizing signal at the concatenation point, and the conditions of the signal inversion interval B alone may be used. To this end, it becomes necessary to know whether the synchronizing signal to be detected is positioned at the concatenation point or not. In this embodiment, the last ECC block recorded at the time of recording is marked by adding information indicative of the last recorded block. For example, one bit of the disk identification data of all the sectors in the last ECC block is used, with "1" being an indication of the last recorded block and "0" being an indication of other than the last recorded block. This provision makes it possible to detect the last recorded block and to know that the end of this block is a synchronizing signal situated at the concatenation point. When detecting this synchronizing signal, the conditions of the signal inversion interval A are disregarded for the purpose of detecting a synchronizing signal. As a result, it is possible to avoid the failure to detect a synchronizing signal, thereby further suppressing the generation of data errors in the ECC block. The provision of the information indicative of the last recorded block makes it possible to perform a special process for reconstructing the concatenation point at the time of data reproduction, thereby suppressing the generation of data errors in the ECC block.

B. Example of Application to Optical Disk Apparatus (Information Recording Apparatus, Information Reproducing Apparatus)

Figure 6:
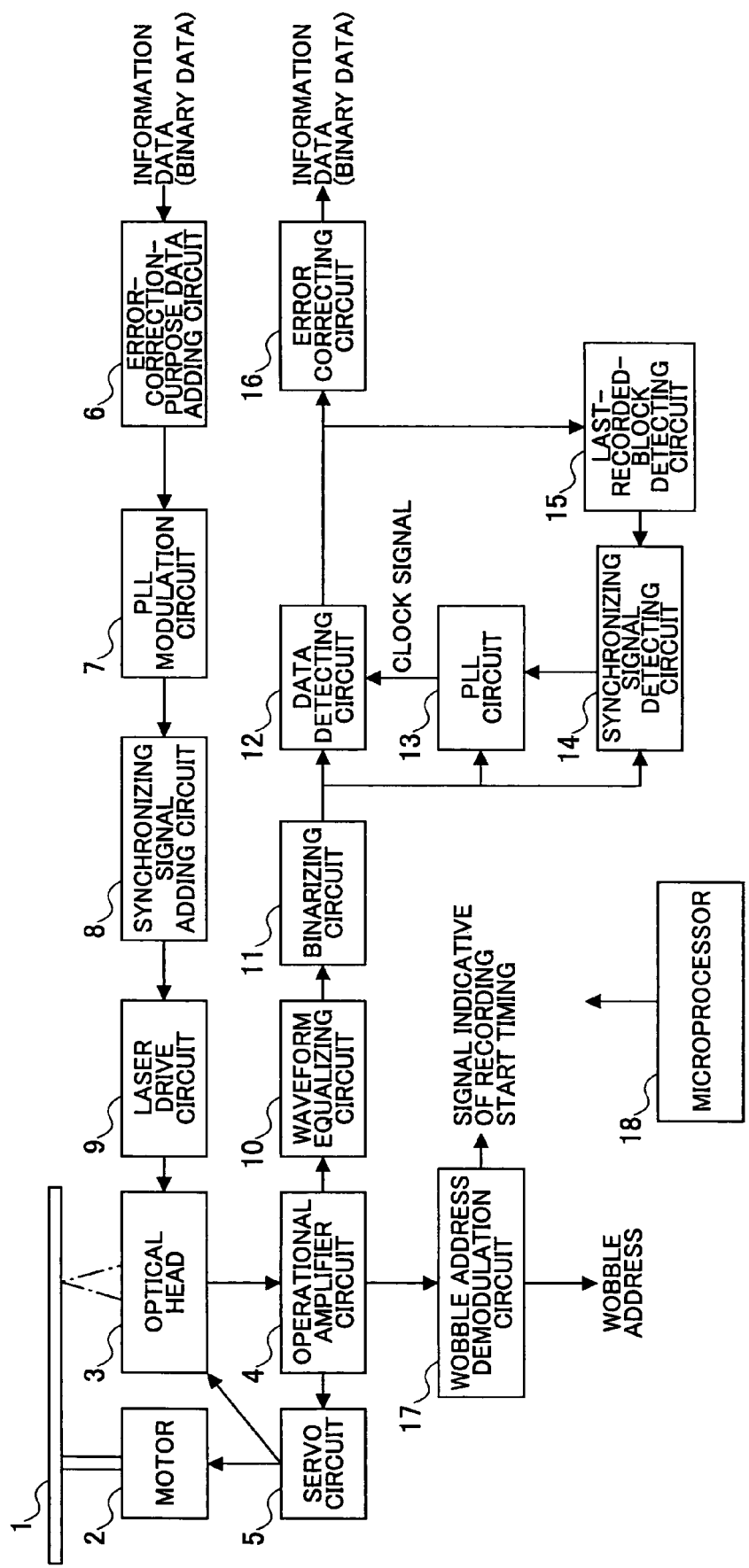
FIG. 6 is a drawing showing an example of the schematic configuration of an optical disk apparatus to which the principle of the present invention relating to binary recording is applied.

FIG. 6 is a drawing showing an example of the schematic configuration of an optical disk apparatus to which the principle of the present invention relating to binary recording is applied. The information recording medium that is subjected to recording/reproducing is an optical disk 1, on which a spiral track or concentric tracks are formed to allow marks to be recorded along the tracks. The tracks slightly wobble with constant cycles. Addresses over the entire surface of the disk are prerecorded as the frequency changes and phase changes of such wobbling. Hereinafter, these addresses are referred to as "wobble addresses". A spindle motor 2 is provided to revolve the optical disk 1. On the optical disk 1 being revolved, a laser spot is shone to record marks. A laser spot also scans the recorded marks, so that an optical head (optical pickup) 3 produces an electrical signal.

The electrical signal output from the optical head 3 is amplified by an operational amplifier circuit 4, which outputs a reproduced signal responsive to the marks on the optical disk 1, a focus error signal indicative of whether the laser spot is properly focused on the record surface of the optical disk 1, a tracking error signal indicative of whether the laser spot is properly scanning by moving along the track, a signal responsive to the wobbling of the track. A servo circuit 5 controls the optical head 3 and the spindle motor 2 based on the focus error signal, the tracking error signal, and the signal responsive to the wobbling of the track, thereby ensuring that the laser spot is properly focused on the record surface of the optical disk 1, that the track is properly scanned, and that the optical disk 1 is revolved at constant linear velocity or at constant angular velocity.

The recording system that constitutes the information recording apparatus unit together with the optical head 3 includes an error-correction-purpose data adding circuit 6, a RLL modulation circuit 7, a synchronizing signal adding circuit 8, and a laser drive circuit 9. The error-correction-purpose data adding circuit (means for forming data) 6 adds error-correction-purpose data to information data (binary data), thereby generating one block data (one ECC block data). The error-correction-purpose data adding circuit 6 also serves as a means to add information indicative of the last recorded block. The RLL (run length limited) modulation circuit 7 converts data such as to make the interval of binary data inversions conform to predetermined rules. The synchronizing signal adding circuit (means for adding a synchronizing signal) 8 adds a synchronizing signal comprised of data portions and no-data portions to the one ECC block data. The laser drive circuit 9 produces a signal for the purpose of recording marks and spaces responsive to binary data on the optical disk 1 by using laser light, and serves as a means to record data together with the optical head 3.

The reproduction system that constitutes the information reproducing apparatus unit together with the optical head 3 includes a waveform equalizing circuit 10, a binarizing circuit 11, a data detecting circuit 12, a PLL circuit 13, a synchronizing signal detecting circuit 14, a last-recorded-block detecting circuit 15, and an error correcting circuit 16. The waveform equalizing circuit 10 performs waveform equalization with respect to a reproduced signal supplied from the operational amplifier circuit 4. The binarizing circuit 11 binarizes the reproduced signal (analog signal) by use of a predetermined threshold. The data detecting circuit (means for detecting binary data) 12 detects the binarized signal as binary data comprised of 0s and 1s in synchronization with the clock signal supplied from the PLL circuit 13. The PLL circuit 13 generates the clock signal synchronized with the binary data supplied from the binarizing circuit 11. The synchronizing signal detecting circuit (means for detecting a synchronizing signal) 14 detects a synchronizing signal in the binarized signal supplied from the binarizing circuit 11. The last-recorded-block detecting circuit (means for detecting information indicative of the last recorded block) 15 detects the disk identification data of a sector, and determines whether a block of interest is the last recorded block. The error correcting circuit (means for performing error correction and outputting information data (binary data)) 16 uses the error-correction-purpose data to correct errors in the ECC block, and outputs information data as binary data.

A wobble address demodulation circuit 17 demodulates the wobble addresses prerecorded on the optical disk 1, thereby outputting a signal indicative of recording start timing at the time of adding or writing in an overwriting manner.

Further, a microprocessor 18 is provided to exercise the overall control of the optical disk apparatus.

Although not shown in the figure, there is also a mechanism that moves the optical head 3 in a radial direction of the optical disk 1 so as to search for data on the optical disk 1. Also omitted from the figure is an interface circuit and the like for the purpose of using the optical disk apparatus as an information recording apparatus for a computer. DVD+RW and/or DVD+R may be used as the optical disk 1, and a laser diode that emits laser light having a wavelength of 650 nm may be used in the optical head 3. A blue-ray laser capable of recording with higher density may be used. An optical disk of a phase-change type (rewritable type) or dye type (inerasable) that is suitable for such laser wavelength (e.g., 405 nm) may be used.

C. Example of Recording Operation

With respect to the optical disk apparatus as described above, a description will be given first of the operation that is performed when information data is recorded on the optical disk 1 on an ECC-block-by-ECC-block basis. Information data (binary data) to be recorded is first supplied to the error-correction-purpose data adding circuit 6, resulting in the data structure as shown in FIG. 1 being generated for an ECC block comprised of n rows by m bytes. This corresponds to a data generating step. With respect to the last ECC block where recording ends, information indicative of the last recorded block is added (corresponding to a step of adding information indicative of the last recorded block). That is, a data bit indicative of either 1 for the last recorded block or 0 is set in one bit of the disk identification data of all the sectors in the last ECC block.

Thereafter, the RLL modulation circuit 7 performs modulation such that the interval of binary data inversions conforms to the predetermined rules. In general, information data and error-correction-purpose data manifest themselves as data patterns having randomly arranged 0s and 1s. If such data patterns are converted into a record signal, such record signal ends up having a wide frequency band. A frequency band usable for recording data on an optical disk is limited by the diameter of the laser spot and the linear velocity of recording. Controlling the interval of record-signal inversions can limit the frequency components. This is the RLL (Run Length Limited) modulation that is used in DVD or the like.

The inversion interval may be restricted to the range from 2 bits to 7 bits by use of the RLL modulation, which can attenuate frequency components corresponding to other inversion intervals. If the inversion interval of a synchronizing signal is set to 8 bits as shown in FIG. 2 to use an interval outside the restricted range (from 2 bits to 7 bits), the detection of the synchronizing signal becomes easier. In order to suppress the direct current component of a signal, further, a data pattern may be selected such as to have equal amounts of two polarizations (HIGH and LOW) of the binary signal as much as possible. To this end, two types of synchronizing signals may be used as shown in FIGS. 4A and 4B. In this case, the synchronizing signal shown in FIG. 4A is used as a synchronizing signal at the boundaries between ECC blocks in order to position the concatenation point at a portion where no mark is provided.

Thereafter, the synchronizing signal adding circuit 8 adds a synchronizing signal as shown in FIG. 2 or FIGS. 4A and 4B, which corresponds to a step of adding a synchronizing signal. In order to record marks and spaces corresponding to the binary data, the laser drive circuit 9 generates a signal for driving the laser diode provided in the optical head 3. The optical head 3 then records marks on the optical disk 1 (step of recording).

When data is recorded on the optical disk 1, recording is performed such that the data matches the wobble addresses prerecorded on the optical disk 1. To this end, the wobble addresses are detected prior to the recording of data. The optical head 3 shines laser light having a constant intensity on the optical disk 1, and performs the optoelectrical conversion of the reflected light to produce an electrical signal. The obtained signal is then supplied to the operational amplifier circuit 4. The servo circuit 5 rotates the optical disk 1 in a stable manner, and controls the tracking and focusing of the optical head 3, thereby outputting a reproduced signal.

The operational amplifier circuit 4 outputs a wobble signal responsive to the wobbling of a track on the optical disk 1 in addition to outputting the reproduced signal. The wobble address demodulation circuit 17 outputs the wobble addresses and a signal indicative of recording start timing. When data is to be recorded on the optical disk 1 at a desired address, the microprocessor 18 makes sure that the wobble address supplied from the wobble address demodulation circuit 17 matches the desired wobble address. The recording of data on the optical disk 1 is then started by using the signal indicative of recording start timing corresponding to this wobble address.

In such recording operation, the start and end of the recording of data are positioned at concatenation points that are located at the portion where no mark is provided in a synchronizing signal at the boundaries between the ECC blocks as shown in FIG. 3. The step or means for controlling the concatenation points is performed by the microprocessor. In so doing, the position of a concatenation points is controlled such as to maintain a constant relative relationship with the position of the addresses recorded as the wobble signal. This ensures positional relationship between the wobble addresses and the recorded data, so that the wobble addresses and the recorded data coincide with each other, which makes it possible to access a recorded area and a non-recorded area indiscriminately on the optical disk 1.

D. Example of Reproduction Operation

In the following, a description will be given of the operation that is performed when data is reproduced from the optical disk 1. The optical head 3 shines laser light having a constant intensity on the optical disk 1, and performs optoelectrical conversion on the reflected light to produce an electrical signal. The produced signal is supplied to the operational amplifier circuit 4. The servo circuit 5 rotates the optical disk 1 in a stable manner, and exercises the tracking and focusing control of the optical head 3, thereby producing a reproduced signal. The waveform equalizing circuit 10 removes inter-code interference, and the binarizing circuit 11 converts the analog signal into a binary signal by using a predetermined threshold. Thereafter, the synchronizing signal detecting circuit 14 detects a synchronizing signal (which corresponds to a step of detecting a synchronizing signal). The PLL circuit 13 generates a clock signal synchronized with the binary data.

The data detecting circuit 12 detects the binary data (which corresponds to a step of detecting binary data). The error correcting circuit 16 performs error correction with respect to one ECC block data, thereby outputting information data, which corresponding to a step of performing error correction and outputting information data). Concurrently with this, the last-recorded-block detecting circuit 15 detects the disk identification data of the sectors so as to determine whether the block of interest is the last recorded block. According to this determination, the conditions used to detect a synchronizing signal are changed at the time of detecting a synchronizing signal at concatenation points. The step and means for changing the conditions used to detect a synchronizing signal are performed by the microprocessor 18.

Second Embodiment

A second embodiment of the present invention will be described with reference to FIG. 7 through FIG. 13. This embodiment shows an example in which the present invention is applied to multilevel recording. Namely, the first embodiment shows an example in which the present invention is applied to binary recording that records 0/1 data by the presence/absence of marks on the optical disk. In the second embodiment, an example is shown in which the present invention is applied to multilevel recording that records three or more data types by using different mark sizes.

A. Principle of Invention as Applied to Multilevel Recording

Figure 7A:
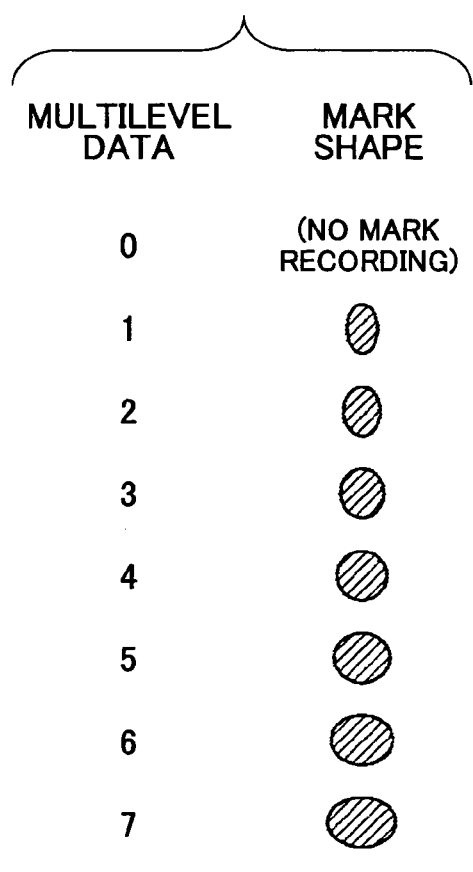
FIGS. 7A and 7B are illustrative drawings showing mark shapes and reproduced signal waveforms, respectively, in the case of multilevel recording.
Figure 7B:
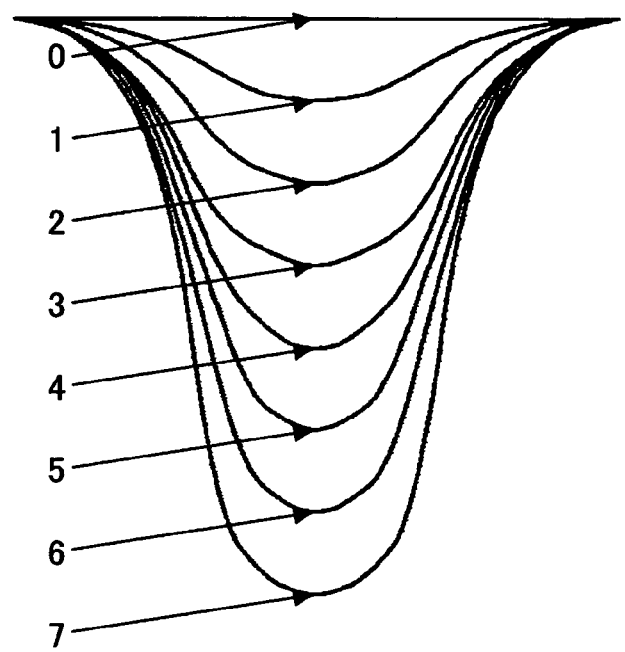

A description will be given here of an example of 8-level recording that records marks by changing the size of marks at 8 different levels inclusive the level for no recording of marks, as shown in FIGS. 7A and 7B. As shown in FIG. 7A, one data item can assume 8 different values, according to which the size of a mark is changed for recording. At the time of reproduction, then, a reproduced signal as shown in FIG. 7B is obtained.

Multilevel data (0 through 7) are detected in the reproduced signal for conversion into binary data. After error correction, conventional binary data is obtained. When information represented in conventional binary data is converted into multilevel data for recording and reproduction, recording density is increased, thereby effectively increasing the recording capacity of an optical disk.

Figure 8A:
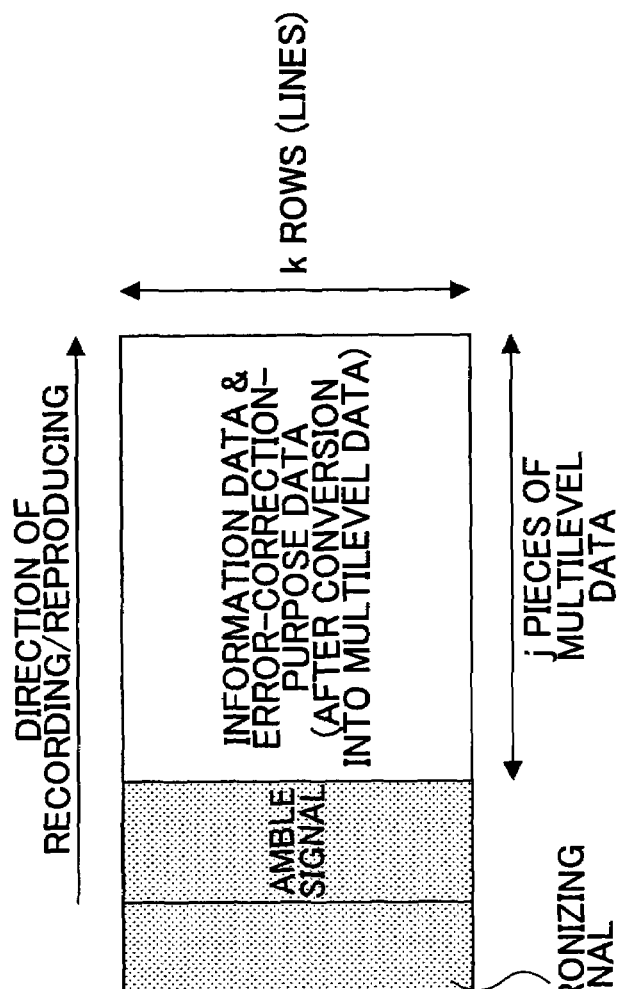
FIG. 8A is a drawing showing an example of a data configuration used when information data (binary data) is converted into multilevel data for recording on an information recording medium such as an optical disk.

FIG. 8A is a drawing showing an example of the data configuration used when information data (binary data) is converted into multilevel data for recording on an information recording medium such as an optical disk. The method of adding error-correction-purpose data to binary information data is the same as that of the conventional art. For example, a product code in which error-correction-purpose data is added in the horizontal and vertical directions as in the case of DVD may be used. In such a case, the number of bits in one horizontal line may be determined as follows for the sake of convenience of conversion into multilevel data.

Non-Patent Document 1 previously described modulates 11 binary data bits into four 8-level data pieces for multilevel recording on an optical disk, as shown in FIG. 12 on page 39. If the data for one horizontal line is comprised of 11-bit word data, such configuration is convenient for conversion into multilevel data. Since information data is provided in units of a byte (8 bits), it is preferable to set the number of data bits for one horizontal line to an integer multiple of 88. The number of data bits in one horizontal line can thus be represented as 88i (i: integer). When these bits are converted into four 8-level data pieces for every 11 bits, the number of multilevel data pieces in one horizontal line becomes 8×4×i=32×i (=j). In the multilevel recording of this embodiment, j pieces by k (integer) lines form one ECC block data.

Figure 9:
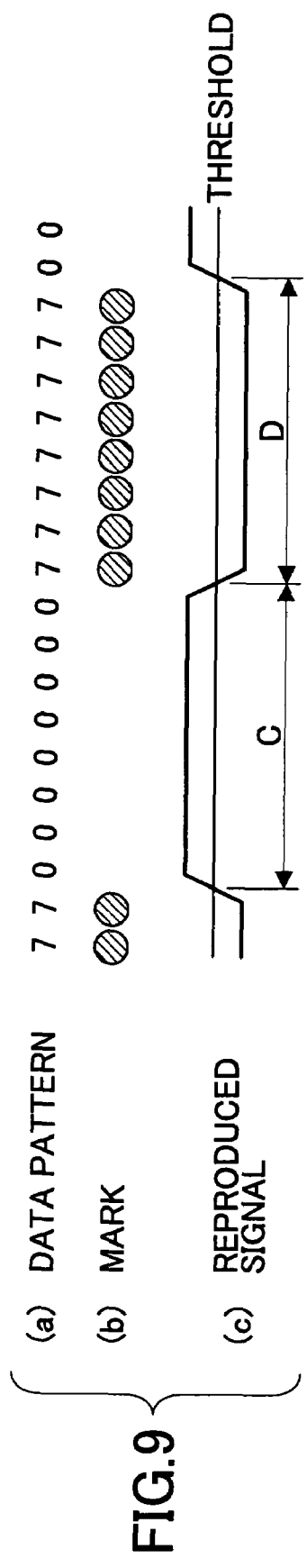
FIG. 9 is a drawing showing an example of a synchronizing signal data pattern.
Figure 10:
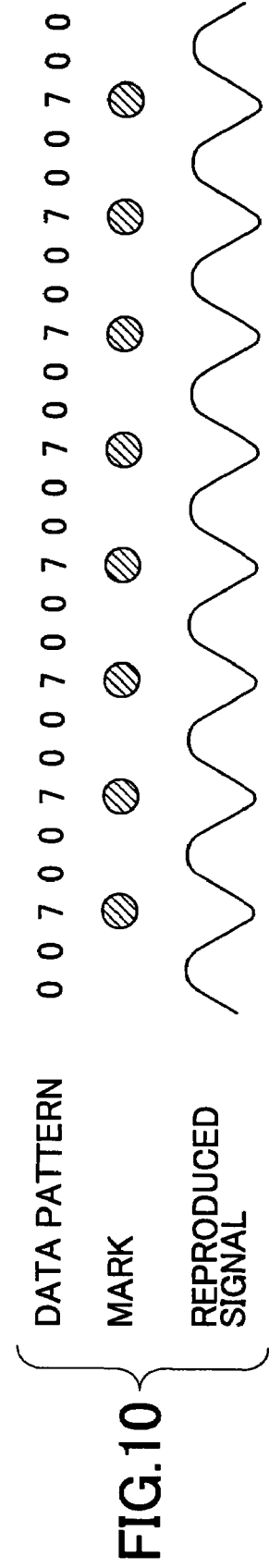
FIG. 10 is a drawing showing an example of an amble signal data patter.

The information data and error-correction-purpose data following conversion into multilevel data are then added with a synchronizing signal and amble signal comprised of multilevel data. FIG. 9 is a drawing showing an example of a synchronizing signal data pattern. FIG. 10 is a drawing showing an example of an amble signal data pattern.

For the purpose of easy detection, a synchronizing signal uses a data pattern in which the maximum value (7) and the minimum value (0) of multilevel data are each arranged continuously. In the same manner as in the case of binary recording, binarization is performed by use of a single threshold, followed by determining whether the interval of inversions (C and D in FIG. 9) satisfy predetermined conditions, thereby detecting a synchronizing signal.

The amble signal is used by the PLL (phase locked loop) circuit for generating a clock signal synchronized with individual multilevel data pieces at the time of data reproduction. In the case of binary recording, a reproduced signal is binarized by use of a predetermined threshold, and the clock signal output of the PLL circuit is controlled to have a predetermined phase at the timing of data inversions. This provides for the clock signal synchronized with the data to be generated. In the case of multilevel recording, a reproduced signal does not exhibit simple changes as in the case of a reproduced signal of binary recording, so that a clock signal cannot be generated by detecting the timing of data inversions. In consideration of this, a signal having repeating patterns (which is herein referred to as an amble signal) permitting the detection of a multilevel data cycle as shown in FIG. 10 is added for recording. At the time of data reproduction, the amble signal is used to synchronize the clock output of the PLL circuit with the multilevel data.

In order to detect the amble signal in the reproduced signal, a synchronizing signal is first detected, and, then, the amble signal is detected by referring to the position of the detected synchronizing signal. It is more preferable to insert, at predetermined intervals in addition to the amble signal, a signal that reveals the position of multilevel data, so that this signal and the clock signal are resynchronized.

Figure 8B:
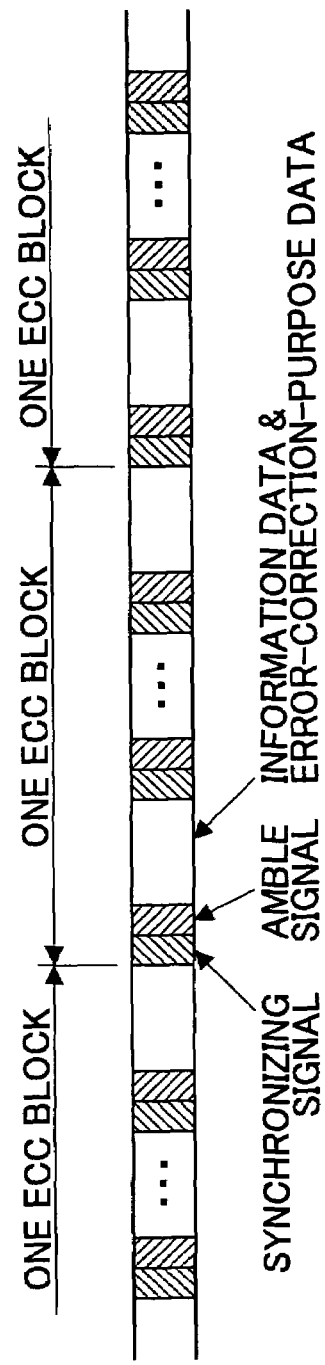
FIG. 8B is an illustrative drawing showing the way the data of individual lines are arranged consecutively at the time of reproduction.

The data having such structure is recorded line by line from left to right as shown in FIG. 8A as one ECC block data on an information recording medium such as an optical disk. FIG. 8B is an illustrative drawing showing the way the data of individual lines are arranged consecutively at the time of reproduction.

Figure 11:
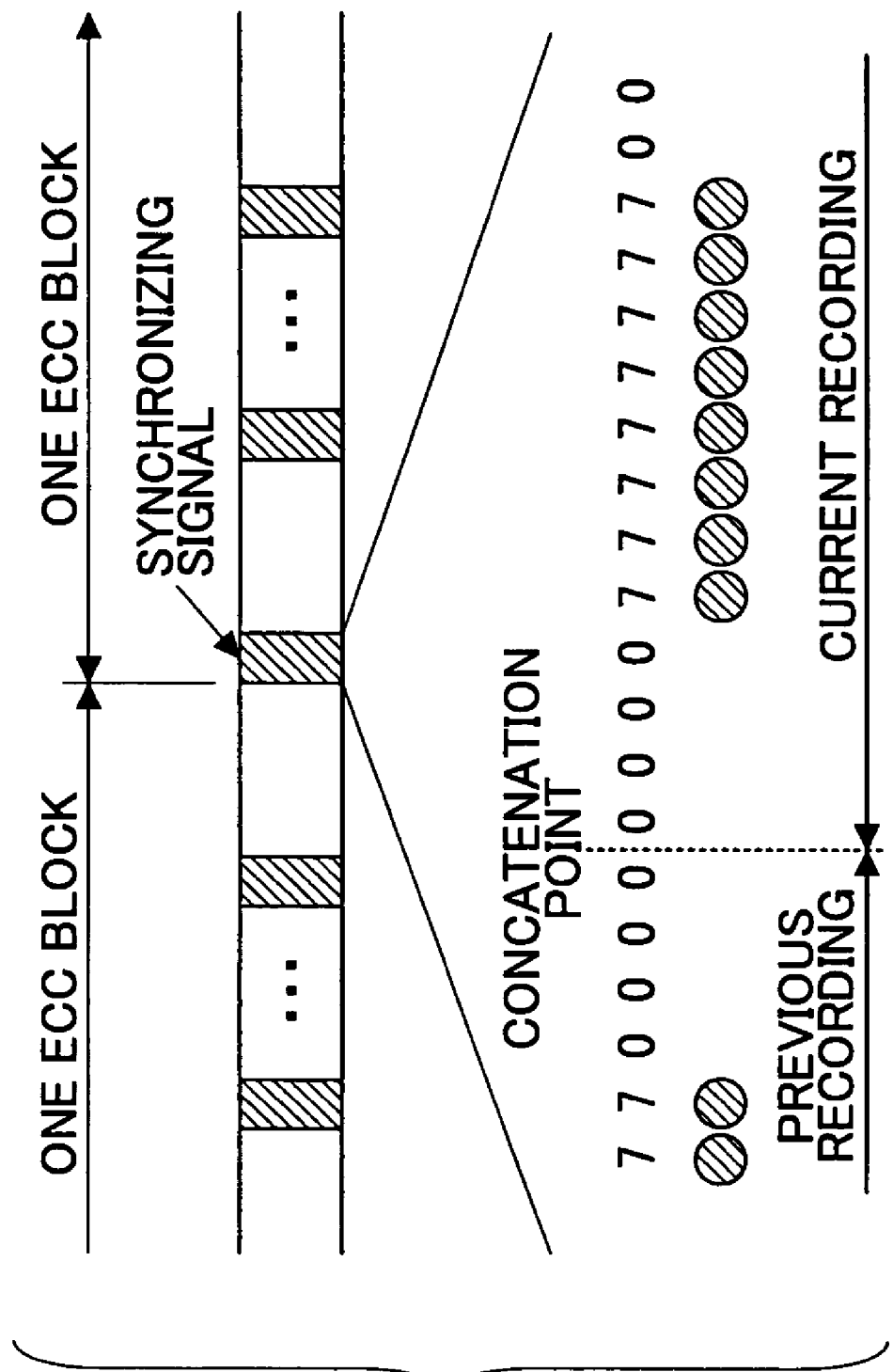
FIG. 11 is a drawing showing the positioning of a concatenation point.

Data is recorded on an optical disk in units of one ECC block. Accordingly, the adding or writing in an overwriting manner of data is also performed in units of one ECC block. In this embodiment, a concatenation point for such recording is located at a predetermined position in a synchronizing signal, e.g., at the portion where no mark is provided (the portion where 0s are continuously arranged). FIG. 11 is a drawing showing such positioning of a concatenation point. In the case of multilevel recording, as in the case of the embodiment of binary recording, a predetermined position in a synchronizing signal is used as a concatenation point, so that there is no irrelevant data inserted into the ECC block. This successfully suppresses the generation of data error in the ECC block at the time of data reproduction. Further, an area (i.e., the related-art linking area) inclusive of a concatenation point is not provided in addition to ECC blocks, thereby avoiding reduction in recording capacity.

In the present embodiment, the concatenation point is positioned in a synchronizing signal at the portion where no marks are provided. If a rewritable-type medium on which erasure of data is possible is used as an information recording medium, such concatenation point may alternatively be positioned at the portion where marks are present. If a write-once-type medium on which erasure of data is not possible is used as an information recording medium, the concatenation point may preferably be positioned at the portion where no marks are present, as in the case of the embodiment of binary recording. This is because if the mark portion recorded on the present occasion overlaps the mark portion of the synchronizing signal recorded on the previous occasion at the time of adding data, the correct recording of marks is not achievable. With the provision of the concatenation point at the portion where no marks are provided (no recording is made), it is possible to avoid the failure to record marks at the concatenation point.

Figure 12A:
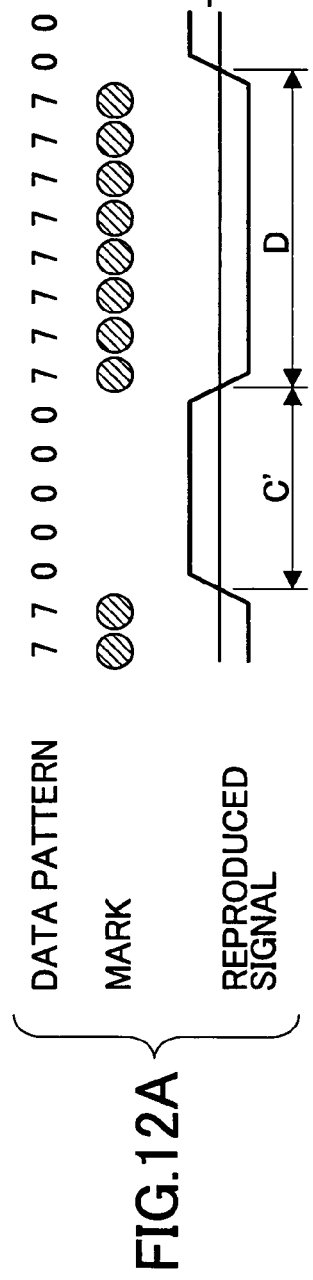
FIGS. 12A and 12B are drawings showing cases in which the length of a portion without marks of a synchronizing signal is changed around the concatenation point.
Figure 12B:
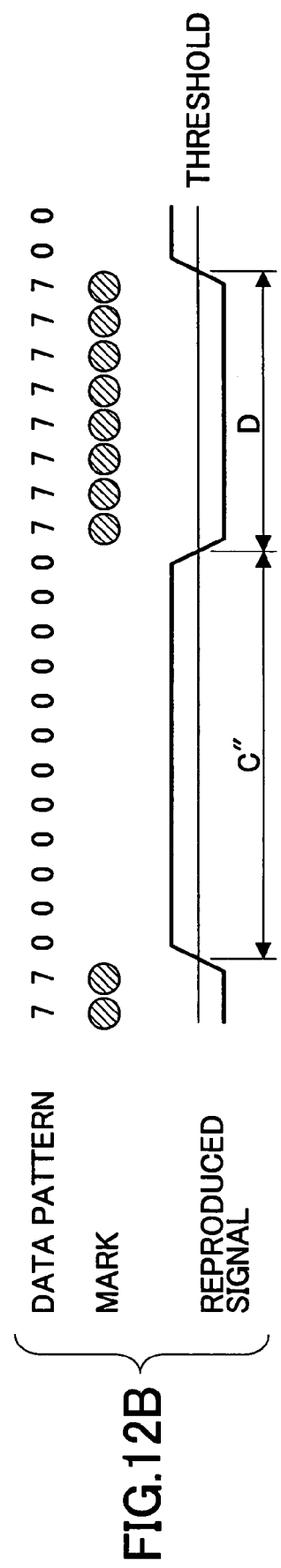

When data is added, or written in an overwriting manner, to an optical disk, it is not guaranteed that the start position of data recording always coincide exactly with the concatenation position. There may be some error. As a result, the length of the portion without marks of the synchronizing signal may be changed around the concatenation point. FIGS. 12A and 12B are drawings showing cases in which the length of the portion without marks of the synchronizing signal is changed around the concatenation point. Namely, the interval C of signal inversions shown in FIG. 9 is generally almost fixed in a reproduced synchronizing signal. As shown in FIGS. 12A and 12B, however, the interval of signal inversions may be shortened to C' or lengthened to C". In such a case, if an attempt is made to detect a synchronizing signal based on the conditions of the signal inversion intervals C and D in the same manner as in the detection of a normal synchronizing signal, the conditions of the interval C is not satisfied, resulting in a failure to detect the synchronizing signal at the concatenation point.

In the present embodiment, the conditions of the signal inversion interval C (the conditions of the length of the signal portion inclusive of the concatenation point) may be disregarded when detecting a synchronizing signal at the concatenation point at the time of data reproduction, and the conditions of the signal inversion interval D alone may be used. To this end, it becomes necessary to know whether the synchronizing signal to be detected is positioned at the concatenation point or not. In this embodiment, the last ECC block recorded at the time of recording is marked by adding information indicative of the last recorded block.

For example, one bit of the disk identification data of all the sectors in the last ECC block is used, with "1" being an indication of the last recorded block and "0" being an indication of other than the last recorded block. This provision makes it possible to detect the last recorded block and to know that the end of this block is a synchronizing signal situated at the concatenation point. When detecting this synchronizing signal, the conditions of the signal inversion interval C are disregarded for the purpose of detecting a synchronizing signal. As a result, it is possible to avoid the failure to detect a synchronizing signal, thereby further suppressing the generation of data errors in the ECC block.

After the detection of the synchronizing signal at the concatenation point, an amble signal following thereto may preferably be used to synchronize the clock signal output of the PLL circuit with the multilevel data. With this provision, it is possible to remove phase fluctuation from the clock signal caused by an error of the position of a recording start point, thereby stabilizing the operation of the PLL circuit and suppressing the generation of data errors in the ECC block.

The provision of the information indicative of the last recorded block makes it possible to perform a special process for reconstructing the concatenation point at the time of data reproduction, thereby suppressing the generation of data errors in the ECC block. Since the amble signal is added, it is possible to remove phase fluctuation in the clock signal caused by an error of the position of a recording start point, thereby stabilizing the operation of the PLL circuit and suppressing the generation of data errors in the ECC block.

B. Example of Application to Optical Disk Apparatus (Information Recording Apparatus, Information Reproducing Apparatus)

Figure 13:
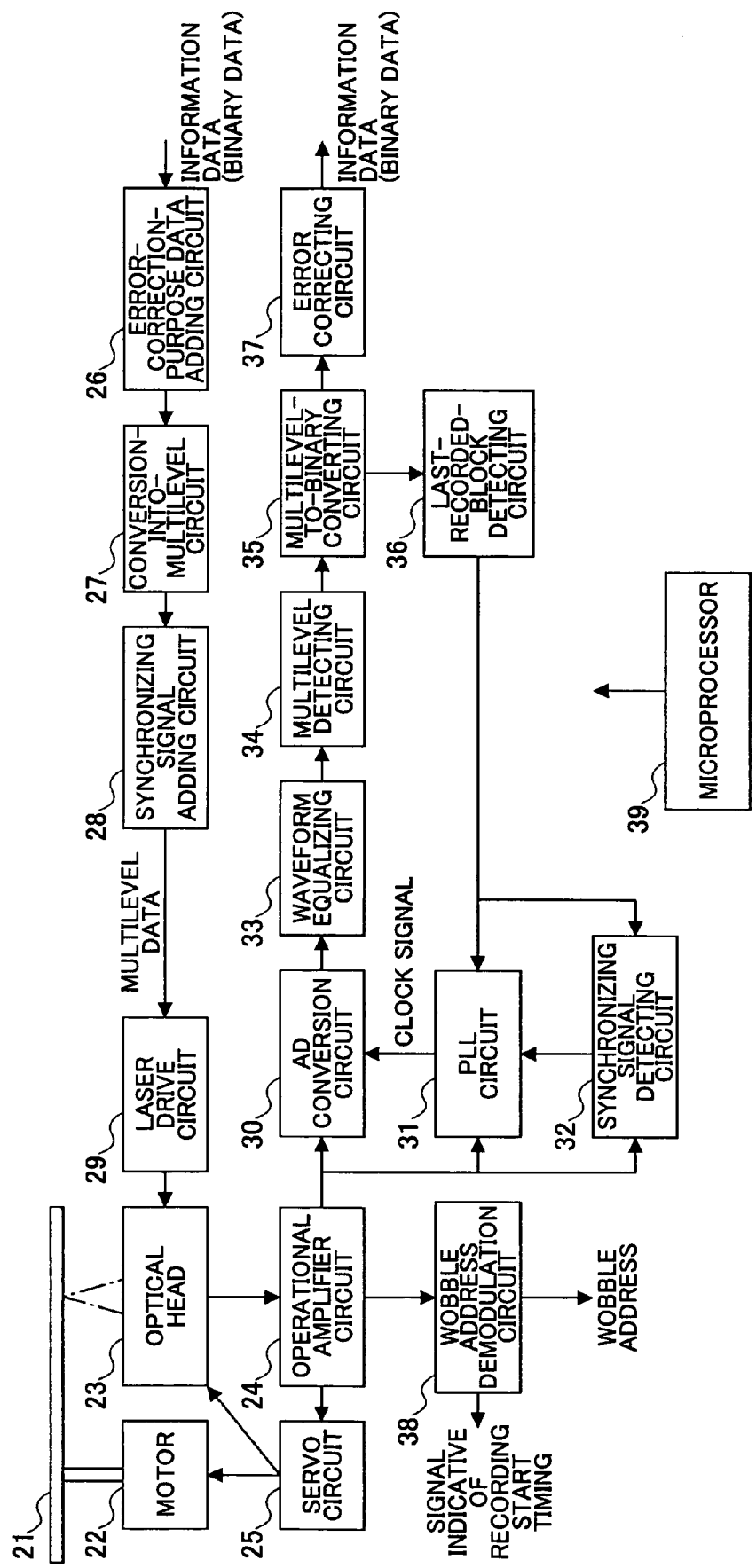
FIG. 13 is a drawing showing an example of the schematic configuration of an optical disk apparatus to which the principle of the present invention relating to multilevel recording is applied.

FIG. 13 is a drawing showing an example of the schematic configuration of an optical disk apparatus to which the principle of the present invention relating to multilevel recording is applied. The information recording medium that is subjected to recording/reproducing is an optical disk 21, on which a spiral track or concentric tracks are formed to allow marks to be recorded along the tracks. The tracks slightly wobble with constant cycles. Addresses over the entire surface of the disk are prerecorded as the frequency changes and phase changes of such wobbling. Hereinafter, these addresses are referred to as "wobble addresses". A spindle motor 22 is provided to revolve the optical disk 21. On the optical disk 21 being revolved, a laser spot is shone to record marks. A laser spot also scans the recorded marks, so that an optical head (optical pickup) 23 produces an electrical signal.

The electrical signal output from the optical head 23 is amplified by an operational amplifier circuit 24, which outputs a reproduced signal responsive to the marks on the optical disk 21, a focus error signal indicative of whether the laser spot is properly focused on the record surface of the optical disk 21, a tracking error signal indicative of whether the laser spot is properly scanning by moving along the track, a signal responsive to the wobbling of the track. A servo circuit 25 controls the optical head 23 and the spindle motor 22 based on the focus error signal, the tracking error signal, and the signal responsive to the wobbling of the track, thereby ensuring that the laser spot is properly focused on the record surface of the optical disk 21, that the track is properly scanned, and that the optical disk 21 is revolved at constant linear velocity or at constant angular velocity.

The recording system that constitutes the information recording apparatus unit together with the optical head 23 includes an error-correction-purpose data adding circuit 26, a conversion-into-multilevel circuit 27, a synchronizing signal adding circuit 28, and a laser drive circuit 29. The error-correction-purpose data adding circuit (means for forming data) 26 adds error-correction-purpose data to information data (binary data). The error-correction-purpose data adding circuit 26 also serves as a means to add information indicative of the last recorded block. The conversion-into-multilevel circuit (means for converting into multilevel data) 27 converts binary data into multilevel data. The synchronizing signal adding circuit (means for adding a synchronizing signal) 28 adds a synchronizing signal comprised of data portions and no-data portions to the one ECC block data that is the converted multilevel data. The laser drive circuit 29 produces a signal for the purpose of recording marks and spaces having the size responsive to the multilevel data on the optical disk 21 by using laser light, and serves as a means to record data together with the optical head 23.

The reproduction system that constitutes the information reproducing apparatus unit together with the optical head 23 includes an AD conversion circuit 30, a PLL circuit 31, a synchronizing signal detecting circuit 32, a waveform equalization circuit 33, a multilevel detecting circuit 34, a multilevel-to-binary converting circuit 35, a last-recorded-block detecting circuit 36, and an error correcting circuit 37. The AD conversion circuit 30 converts an analog reproduced signal into a digital signal. The PLL circuit 31 generates a clock signal synchronized with multilevel data. The synchronizing signal detecting circuit (means for detecting a synchronizing signal) 32 detects a synchronizing signal in the reproduced signal. The waveform equalization circuit 33 performs waveform equalization by way of digital signal processing. The multilevel detecting circuit 34 detects multilevel data. The multilevel-to-binary converting circuit 35 converts the multilevel data into binary data. The last-recorded-block detecting circuit (means for detecting information indicative of the last recorded block) 36 detects the disk identification data of a sector, and determines whether a block of interest is the last recorded block. The error correcting circuit (means for performing error correction and outputting information data (binary data)) 37 uses the error-correction-purpose data to correct errors in the ECC block, and outputs information data as binary data.

A wobble address demodulation circuit 38 demodulates the wobble addresses prerecorded on the optical disk 21, thereby outputting a signal indicative of recording start timing at the time of adding or writing in an overwriting manner.

Further, a microprocessor 39 is provided to exercise the overall control of the optical disk apparatus.

Although not shown in the figure, there is also a mechanism that moves the optical head 23 in a radial direction of the optical disk 21 so as to search for data on the optical disk 21. Also omitted from the figure is an interface circuit and the like for the purpose of using the optical disk apparatus as an information recording apparatus for a computer. DVD+RW and/or DVD+R may be used as the optical disk 21, and a laser diode that emits laser light having a wavelength of 650 nm may be used in the optical head 23. A blue-ray laser capable of recording with higher density may be used. An optical disk of a phase-change type (rewritable type) or dye type (inerasable) that is suitable for such laser wavelength (e.g., 405 nm) may be used.

C. Example of Recording Operation

With respect to the optical disk apparatus as described above, a description will first be given of the operation that is performed when information data is recorded as multilevels on the optical disk 1 in units of one ECC block. The description here will be directed to an example in which marks are controlled to have 8 different sizes to perform 8-level recording inclusive of the level for the recording of no mark as shown in FIGS. 7A and 7B.

The information data (binary data) to be recorded is supplied to the error-correction-purpose data adding circuit 26 for addition of error-correction-purpose data. The conversion-into-multilevel circuit 27 then converts every 11 bits of the binary data into four 8-level data pieces, which corresponds to a step of structuring data. This results in the ECC block data having j pieces and k rows as shown in FIG. 8A being generated. With respect to the last ECC block where recording ends, information indicative of the last recorded block is added (corresponding to a step of adding information indicative of the last recorded block). That is, a data bit indicative of either 1 for the last recorded block or 0 for other blocks is set in one bit of the disk identification data of all the sectors in the last ECC block.

Thereafter, the synchronizing signal adding circuit 28 adds a synchronizing signal as shown in FIG. 9 and an amble signal as shown in FIG. 10, which corresponds to a step of adding a synchronizing signal and a step of adding a signal for detecting the time cycle of multilevel data. The laser drive circuit 29 then generates a signal for recording marks responsive to the individual levels of multilevel data on the optical disk 21. The optical head 23 then records marks on the optical disk 21 (step of recording).

When data is recorded on the optical disk 21 in this manner, recording is performed such that the data matches the wobble addresses prerecorded on the optical disk 21. To this end, the wobble addresses are detected prior to the recording of data. The optical head 23 shines laser light having a constant intensity on the optical disk 21, and performs the optoelectrical conversion of the reflected light to produce an electrical signal. The obtained signal is then supplied to the operational amplifier circuit 24. The servo circuit 25 rotates the optical disk 1 in a stable manner, and controls the tracking and focusing of the optical head 23, thereby outputting a reproduced signal.

The operational amplifier circuit 24 outputs a wobble signal responsive to the wobbling of a track on the optical disk 21 in addition to outputting the reproduced signal. The wobble address demodulation circuit 38 outputs the wobble addresses and a signal indicative of recording start timing. When data is to be recorded on the optical disk 21 at a desired address, the microprocessor 39 makes sure that the wobble address supplied from the wobble address demodulation circuit 38 matches the desired wobble address. The recording of data on the optical disk 21 is then started by using the signal indicative of recording start timing corresponding to this wobble address.

In such recording operation, the start and end of the recording of data are positioned at concatenation points that are located at the portion where no mark is provided in a synchronizing signal at the boundaries between the ECC blocks as shown in FIG. 11. The step or means for controlling the position of concatenation points is performed by the microprocessor 39. In so doing, the position of a concatenation points is controlled such as to maintain a constant relative relationship with the position of the addresses recorded as the wobble signal. This ensures positional relationship between the wobble addresses and the recorded data, so that the wobble addresses and the recorded data coincide with each other, which makes it possible to access a recorded area and a non-recorded area indiscriminately on the optical disk 21.

D. Example of Reproduction Operation

In the following, a description will be given of the operation that is performed when data is reproduced from the optical disk 21. The optical head 23 shines laser light having a constant intensity on the optical disk 21, and performs optoelectrical conversion on the reflected light to produce an electrical signal. The produced signal is supplied to the operational amplifier circuit 24. The servo circuit 25 rotates the optical disk 21 in a stable manner, and exercises the tracking and focusing control of the optical head 23, thereby producing a reproduced signal (multilevel signal). This corresponds to a step of detecting multilevel data.

The synchronizing signal detecting circuit 32 detects a synchronizing signal in the multilevel signal (which corresponds to a step of detecting a synchronizing signal). Utilizing a subsequent amble signal, the PLL circuit 31 generates a clock signal synchronized with the multilevel data. This corresponds to a step of re-synchronizing the clock synchronized with the multilevel data. The AD conversion circuit 30 converts the multilevel signal into a digital signal by use of the clock signal, thereby producing digital multilevel data. Thereafter, the waveform equalization circuit 33 performs waveform equalization by way of digital signal processing. The multilevel detecting circuit 34 then detects the multilevel data (0 to 7). The multilevel-to-binary converting circuit 35 converts the multilevel data into binary data (0s and 1s), which corresponds to a step of converting into binary data. The error correcting circuit 37 performs error correction with respect to one ECC block data, thereby outputting information data, which correspongding to a step of performing error correction and outputting information data. Concurrently with this, the last-recorded-block detecting circuit 36 detects the disk identification data of the sectors so as to determine whether the block of interest is the last recorded block. This corresponds to a step of detecting information indicative of the last recorded block. According to this determination, the conditions used to detect a synchronizing signal are changed at the time of detecting a synchronizing signal at concatenation points. The step and means for changing and controlling the conditions used to detect a synchronizing signal are performed by the microprocessor 39. Further, the PLL circuit 31 uses the amble signal to synchronize the clock signal with the multilevel data following the concatenation point.

Further, the present invention is not limited to these embodiments, but various variations and modifications may be made without departing from the scope of the present invention.

The present application is based on Japanese priority application No. 2004-157354 filed on May 27, 2004, with the Japanese Patent Office, the entire contents of which are hereby incorporated by reference.

What is claimed is:

1. A method of recording data as presence/absence of marks on an information recording medium, comprising:
   a step of obtaining data pieces, each of which has size of one block and is made by adding error-correction-purpose data to information data;
   a step of attaching to each of the data pieces a synchronizing signal that includes a portion having the marks and a portion having no mark;
   a step of recording the data pieces on the information recording medium in units of the one block inclusive of the synchronizing signal; and
   a step of placing a concatenation point at a predetermined position within the synchronizing signal when adding, or writing in an overwriting manner, the data pieces in units of the one block, said concatenation point defining a position at which said adding or said writing starts.

2. The method as claimed in claim 1, wherein said step of placing places the concatenation point at the portion having no mark in the synchronizing signal.

3. The method as claimed in claim 1, further comprising a step of adding information to a block immediately preceding the concatenation point, said information indicating that the block immediately preceding the concatenation point is a last recorded block.

4. The method as claimed in claim 2, wherein said step of attaching attaches such synchronizing signal that the concatenation point is placed on the portion having no mark.

5. A method of reproducing the data pieces from the information recording medium recorded by the method of claim 3, comprising:
   a step of detecting binary data as presence/absence of the marks in a signal reproduced from the information recording medium;
   a step of detecting the synchronizing signal in the detected binary data according to predetermined detection conditions;
   a step of producing the information data by performing error correction on the detected binary data by use of the error-correction-purpose data;
   a step of detecting the information indicating the last recorded block in the detected binary data; and
   a step of modifying the detection conditions when detecting the synchronizing signal at the concatenation point in response to the detection of the information indicating the last recorded block.

6. The method as claimed in claim 5, wherein said step of modifying the detection conditions disregards the detection conditions regarding a length of a signal portion containing the concatenation point.

7. An apparatus for reproducing the data pieces from the information recording medium recorded by the method of claim 3, comprising:
   a data detecting unit configured to detect binary data as presence/absence of the marks in a signal reproduced from the information recording medium;
   a synchronizing signal detecting unit configured to detect the synchronizing signal in the detected binary data according to predetermined detection conditions;
   a producing unit configured to produce the information data by performing error correction on the detected binary data by use of the error-correction-purpose data;
   an information detecting unit configured to detect the information indicating the last recorded block in the detected binary data; and
   a modifying unit configured to modify the detection conditions when detecting the synchronizing signal at the concatenation point in response to the detection of the information indicating the last recorded block.

8. The apparatus as claimed in claim 7, wherein said modifying step is configured to disregard the detection conditions regarding a length of a signal portion containing the concatenation point.

9. A method of recording multilevel data by changing size of marks on an information recording medium, comprising:
   a step of obtaining data pieces, each of which has size of one block and is made by adding error-correction-purpose data to binary information data;
   converting the data pieces into multilevel data pieces;
   a step of attaching to each of the multilevel data pieces a synchronizing signal that includes a portion having the marks and a portion having no mark;
   a step of recording the multilevel data pieces on the information recording medium in units of the one block inclusive of the synchronizing signal; and
   a step of placing a concatenation point at a predetermined position within the synchronizing signal when adding, or writing in an overwriting manner, the multilevel data pieces in units of the one block, said concatenation point defining a position at which said adding or said writing starts.

10. The method as claimed in claim 9, wherein said step of placing places the concatenation point at the portion having no mark in the synchronizing signal.

11. The method as claimed in claim 9, further comprising a step of attaching to a portion following said synchronizing signal a signal for detecting a time interval of the multilevel data.

12. A method of reproducing the multilevel data pieces from the information recording medium recorded by the method of claim 11, comprising:
   a step of detecting multilevel data by detecting the marks in a signal reproduced from the information recording medium;
   a step of detecting the synchronizing signal in the detected multilevel data according to predetermined detection conditions;
   a step of converting the detected multilevel data into binary data;

a step of producing the information data by performing error correction on the binary data by use of the error-correction-purpose data;
a step of detecting the information indicating the last recorded block in the binary data;
a step of modifying the detection conditions when detecting the synchronizing signal at the concatenation point in response to the detection of the information indicating the last recorded block; and
a step of re-synchronizing a clock signal synchronized with the detected multilevel data in response to the signal for detecting a time interval of the multilevel data.

13. An apparatus for reproducing the multilevel data pieces from the information recording medium recorded by the method of claim 11, comprising:
a data detecting unit configured to detect multilevel data by detecting the marks in a signal reproduced from the information recording medium;
a synchronizing signal detecting unit configured to detect the synchronizing signal in the detected multilevel data according to predetermined detection conditions;
a converting unit configured to convert the detected multilevel data into binary data;
a producing unit configured to produce the information data by performing error correction on the binary data by use of the error-correction-purpose data;
an information detecting unit configured to detect the information indicating the last recorded block in the binary data;
a modifying unit configured to modify the detection conditions when detecting the synchronizing signal at the concatenation point in response to the detection of the information indicating the last recorded block; and
a re-synchronizing unit configured to re-synchronize a clock signal synchronized with the detected multilevel data in response to the signal for detecting a time interval of the multilevel data.

14. The method as claimed in claim 9, further comprising a step of adding information to a block immediately preceding the concatenation point, said information indicating that the block immediately preceding the concatenation point is a last recorded block.

15. A method of reproducing the multilevel data pieces from the information recording medium recorded by the method of claim 14, comprising:
a step of detecting multilevel data by detecting the marks in a signal reproduced from the information recording medium;
a step of detecting the synchronizing signal in the detected multilevel data according to predetermined detection conditions;
a step of converting the detected multilevel data into binary data;
a step of producing the information data by performing error correction on the binary data by use of the error-correction-purpose data;
a step of detecting the information indicating the last recorded block in the binary data; and
a step of modifying the detection conditions when detecting the synchronizing signal at the concatenation point in response to the detection of the information indicating the last recorded block.

16. The method as claimed in claim 15, wherein said step of modifying the detection conditions disregards the detection conditions regarding a length of a signal portion containing the concatenation point.

17. An apparatus for reproducing the multilevel data pieces from the information recording medium recorded by the method of claim 14, comprising:
a data detecting unit configured to detect multilevel data by detecting the marks in a signal reproduced from the information recording medium;
a synchronizing signal detecting unit configured to detect the synchronizing signal in the detected multilevel data according to predetermined detection conditions;
a converting unit configured to convert the detected multilevel data into binary data;
a producing unit configured to produce the information data by performing error correction on the binary data by use of the error-correction-purpose data;
an information detecting unit configured to detect the information indicating the last recorded block in the binary data; and
a modifying unit configured to modify the detection conditions when detecting the synchronizing signal at the concatenation point in response to the detection of the information indicating the last recorded block.

18. The apparatus as claimed in claim 17, wherein said modifying unit is configured to disregard the detection conditions regarding a length of a signal portion containing the concatenation point.

19. An apparatus for recording data as presence/absence of marks on an information recording medium, comprising:
an obtaining unit configured to obtain data pieces, each of which has size of one block and is made by adding error-correction-purpose data to information data;
an attaching unit configured to attach to each of the data pieces a synchronizing signal that includes a portion having the marks and a portion having no mark;
a recording unit configured to record the data pieces on the information recording medium in units of the one block inclusive of the synchronizing signal; and
a placing unit configured to place a concatenation point at a predetermined position within the synchronizing signal when adding, or writing in an overwriting manner, the data pieces in units of the one block, said concatenation point defining a position at which said adding or said writing starts.

20. The apparatus as claimed in claim 19, further comprising a unit configured to add information to a block immediately preceding the concatenation point, said information indicating that the block immediately preceding the concatenation point is a last recorded block.

21. The apparatus as claimed in claim 19, wherein said placing unit is configured to place the concatenation point at the portion having no mark in the synchronizing signal.

22. The apparatus as claimed in claim 21, wherein said attaching unit is configured to attach such synchronizing signal that the concatenation point is placed on the portion having no mark.

23. An apparatus for recording multilevel data by changing size of marks on an information recording medium, comprising:
an obtaining unit configured to obtain data pieces, each of which has size of one block and is made by adding error-correction-purpose data to binary information data;
a converting unit configured to convert the data pieces into multilevel data pieces;
an attaching unit configured to attach to each of the multilevel data pieces a synchronizing signal that includes a portion having the marks and a portion having no mark;

a recording unit configured to record the multilevel data pieces on the information recording medium in units of the one block inclusive of the synchronizing signal; and a placing unit configured to place a concatenation point at a predetermined position within the synchronizing signal when adding, or writing in an overwriting manner, the multilevel data pieces in units of the one block, said concatenation point defining a position at which said adding or said writing starts.

24. The apparatus as claimed in claim 23, wherein said placing unit is configured to place the concatenation point at the portion having no mark in the synchronizing signal.

25. The apparatus as claimed in claim 23, further comprising an adding unit configured to add information to a block immediately preceding the concatenation point, said information indicating that the block immediately preceding the concatenation point is a last recorded block.

26. The apparatus as claimed in claim 23, further comprising a unit configured to attach to a portion following said synchronizing signal a signal for detecting a time interval of the multilevel data.

* * * * *